Jan. 24, 1939.　　　　E. G. WRIGHT　　　　2,145,003

THERMOSTATIC VALVE

Filed April 4, 1936

INVENTOR.

BY Everitt G. Wright

ATTORNEY.

Patented Jan. 24, 1939

2,145,003

UNITED STATES PATENT OFFICE 2,145,003

THERMOSTATIC VALVE

Everett G. Wright, Detroit, Mich., assignor to James A. Kinnard, Detroit, Mich.

Application April 4, 1936; Serial No. 72,676

2 Claims. (Cl. 236—34)

This invention relates to thermostatic valves of the butterfly type and in particular to temperature responsive devices used for controlling the circulation of the cooling fluid in the cooling system of automobile engines and the like.

One object of this invention is to provide a thermostatic valve assembly preferably adapted to be operatively located within a flexible connection between an internal combustion engine and the radiator of its cooling system, the butterfly valve thereof being preferably actuated by a fluid filled bellows type temperature responsive element mounted thereon in such a manner as to cause a positive pivotal movement of the said valve.

Another object of this invention is to provide a thermostatic valve assembly having the bellows type thermostatic element thereof located eccentric to its pivotal mounting and adapted to cooperate with an arcuate ball socket secured to the valve housing in such a manner as to permit the power stroke of the said thermostatic element to be always normal to the face of the valve.

Another object of this invention is to provide a thermostatic valve assembly having the bellows type thermostatic element thereof located eccentric to its pivotal mounting and adapted to react against a floating ball joint in such a manner as to cause the power stroke of the said thermostatic element to act at all times tangential to the arcuate path of the bellows.

Another object of this invention is to provide a thermostatic valve assembly having the bellows type thermostatic element thereof located eccentric to its pivotal mounting and adapted to open and close the said valve responsive to the said thermostatic element without the use of springs or the like for urging the said valve to its open or closed position.

Another object of this invention is to provide a butterfly type thermostatic valve assembly having a floating ball and socket connection between the movable valve member and the housing, the said valve assembly being suitably baffled to constantly urge the said movable valve member from its full open position.

Another object of this invention is to provide a thermostatic valve assembly having its bellows type thermostatic element preferably integral with the pivoted butterfly valve thereof, the said assembly being compactly constructed of a comparatively few simple parts, easy to assemble and economical to manufacture.

Another object of this invention is to provide a thermostatic valve assembly having a ball headed linkage member adjustably secured to the bellows type thermostatic element thereof and adapted to cooperate with an arcuate ball socket secured to the valve housing.

Another object of this invention is to provide a thermostatic valve having a ball and arcuate socket joint between the thermostatic element thereof and the housing disposed so as to be free from deposits of foreign matter passing through the said valve.

Other objects of the invention will become apparent by reference to the following detailed description taken in connection with the accompanying drawing, in which.

Figures 1, 3:
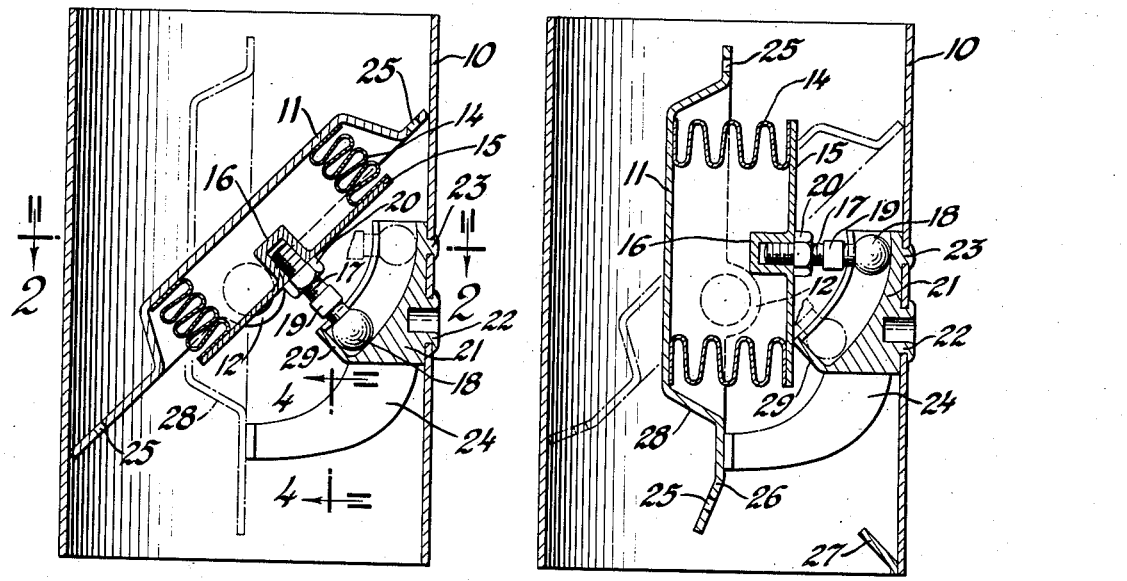
Fig. 1 is a longitudinal sectional view of a thermostatic valve assembly embodying the invention, the pivoted butterfly valve thereof being shown in its closed position.
Fig. 3 is a longitudinal sectional view of a thermostatic valve assembly indicating another embodiment of the invention, the pivoted butterfly valve thereof being shown in its open position.
Figure 2:
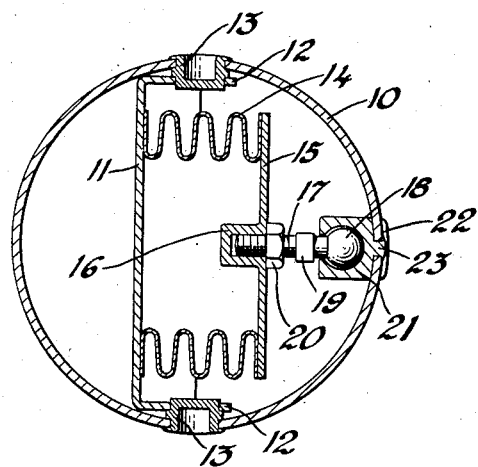
Fig. 2 is a cross sectional view taken on line 2—2 of Fig. 1 with the valve shown in its open position.
Figure 4:
Fig. 4 is a sectional view taken on line 4—4 of Fig. 1 looking in the direction indicated by the arrows.

Referring particularly to the drawing wherein like numerals refer to like and corresponding parts throughout the several views, the embodiment of the improved thermostatic valve shown in Figs. 1, 2 and 4 comprises a housing or casing 10 having a butterfly type valve member 11 therein. The valve type member 11 is preferably formed with a pair of oppositely disposed integral lugs 12 having suitable apertures therein through which shouldered bearings 13 pivotally support the said valve member 11 from diametrically opposite sides of the tubular housing or casing 10. The said shouldered bearings 13 may be secured to the casing 10 by peening or rolling the same into engagement therewith.

The valve member 11 is provided with a substantially annular dished or depressed portion eccentric to its pivotal mounting which serves as the base of a thermostatic element or bellows 14 and tends to streamline the same. The bellows 14 may, of course, be provided with a separate base which in turn may be secured in the dished portion of the valve member 11. The movable end 15 of the bellows 14 is preferably provided with an inwardly disposed central boss 16 into which is adjustably threaded a linkage member or pin 17 having a ball shaped head 18 integral therewith. The said linkage pin 17 has a square shouldered portion 19 by means of which the said pin 17 may be turned into or out of the boss 16 for adjusting the distance from the top of its ball shaped head 18 to the movable end 15 of the bellows 14. A lock nut 20 threaded on the linkage pin 17 and turned tight against the movable end 15 of the bellows 14 secures the said linkage pin 17 in its adjusted position.

An arcuately grooved shaped socket 21 of a suitable cross section to accommodate the ball shaped head 18 of the linkage pin 17 is secured to the housing 10 in such a position that the ball shaped head 18 of the linkage pin 17 is retained therein when the butterfly valve member 11 is in its closed position as indicated by the full lines in Fig. 1 or in its open position as indicated by the dot and dash lines in Fig. 1, or in any position therebetween. The said arcuate socket 21 is preferably provided with an annular protruding collar 22 and a tab 23 which extend through suitably located apertures in the housing 10 and are rolled or peened into engagement with the said housing 10 for securing the said arcuate shaped socket 21 thereto.

A stop 24 which may be integral with the said arcuate socket 21 is preferably shaped as indicated in Fig. 4 to direct cooling fluid passing through the valve assembly around the said arcuate socket 21. The butterfly valve member 11 may be provided with one or more suitably disposed and sized apertures 25 through which a small amount of cooling fluid passes for the purpose of maintaining a slight circulation of cooling fluid through the cooling system regulated by the said valve 11 when the valve is closed. The slight circulation of the cooling fluid from an engine through apertures 25 in the valve 11 when the said valve is closed permits a quick response by the thermostatic element operating the same to slight temperature changes of the cooling fluid in the engine. The size and location of the aperture 25 or apertures 25, as the case may be, in the valve member 11 may also be used to balance the valve 11 when closed against the pressure of the cooling fluid where the cooling fluid is under forced circulation.

The embodiment of the invention shown in Fig. 3 is of similar construction to the embodiment hereinbefore described, however, the butterfly valve 11 has been shown in its open position in Fig. 3 with its closed position being indicated by the dot and dash lines therein. It will be noted that the butterfly valve 11 in Fig. 3 is bent at the inflow end thereof preferably as designated by the numeral 26 and that the housing 10 is provided with a suitably disposed baffle 27 also at the inflow end thereof. Under certain high velocities of coolant passing through the valve assembly the valve 11 will not start to close from its open position when the thermostatic element 14 contracts without there being present a tendency or constant urging of the valve 11 to rotate toward its closed position. The streamlining 26 of butterfly valve 11 at its inflow end and the placing of a suitable baffle 27 at the inflow end of the housing 10 provides simple means for constantly urging the said butterfly valve 11 to rotate toward its closed position.

When the valve 11 of the embodiment of the invention shown in Fig. 1 is in its open position as indicated by the dot and dash lines therein, coolant passing the said valve 11 and contacting the beveled surface 28 of the dished portion thereof constantly urges the said valve against the stop 24 which prevents a fluttering of the valve 11 when the temperature of the coolant is at such a point that the thermostatic element or bellows is changing the direction of its power stroke.

The said streamlining 26 of the butterfly valve 11 in the embodiment of the invention shown in Fig. 3 at its inflow end and the providing of a suitably disposed baffle 27 at the inflow end of the housing 10 overcomes the effort of the coolant passing the said valve 11 and contacting the beveled surface 28 of the dished portion thereof to urge the said valve against the stop 24, however, inasmuch as the valve 11 in Fig. 3 is constantly urged to rotate toward its closed position, the said valve has no tendency to flutter.

By closing the end 29 of the arcuate socket 21 as shown in Figs. 1 and 3 the said socket 21 has all of its openings disposed in the same direction as the flow of coolant through the valve assembly thereby assuring against the accumulation of foreign matter in the ball and arcuate socket joint thereof.

In both embodiments shown in the drawing, it is desirable and preferable to charge the bellows 14 in a manner such as will cause it to be normally under a vacuum so that in the event of leakage the bellows 14 will expand due to the loss of the vacuum and open the valve member 11 to a position of safety.

The bellows 14 is preferably secured to the dished portion of the butterfly valve member 11 exactly on the longitudinal center line thereof and at a definite distance eccentric to the pivotal center of the said valve 11. The bellows is preferably charged and the linkage pin 17 is adjusted so that at a given temperature, say 140 degrees, the top of the ball shaped head 18 of the said linkage pin 17 is at a predetermined gaged distance above the base of the dished portion of the said valve 11. The lock nut 20 threaded on the linkage pin 17 is then turned against the movable end 15 of the bellows to maintain the linkage pin 17 in its adjusted position. The butterfly valve is then assembled in the housing 10 and the ball head 18 of the linkage pin 17 is placed into operating relationship with the arcuate shaped socket 21 secured to the housing 10 in the proper position to cooperate with the headed linkage pin 17 secured to the thermostatic element 14 on the pivoted butterfly valve 11.

Although pre-assembly adjustment of the linkage pin 17 in respect to the movable end 15 of the bellows 14 is normally sufficient, the said linkage pin 17 is easily accessible after assembly for adjustment as is obviously apparent by reference to Fig. 3. By adjusting the height of the ball shaped head 18 of the linkage pin 17 above the movable end 15 of the thermostatic element 14, the operating temperature of the valve 11 may be varied within reasonable limits, or, the said adjustment may be utilized to compensate for reasonable variations in the charge of the thermostatic element 14.

The valve 11 of the thermostatic valve assembly when placed in a flexible connection between an automotive or internal combustion engine and the radiator of its cooling system remains closed when the temperature of the coolant in the cooling system is lower than say 140 degrees, the temperature at which the thermostatic element 14 is charged and set. A slight circulation of the coolant is permitted through apertures 25 in the said valve 11 until the temperature of the coolant from the engine exceeds the predetermined operating point of the thermostatic element 14. As the temperature of the coolant increases above 140 degrees, the thermostatic element 14 expands and urges the valve 11 to its open position with the ball head of the linkage pin secured in the movable end 15 of the thermostatic element 14 retained in and acting against the arcuate shaped socket 21. Conversely, when the said valve 11 is open or partially open and the temperature of the coolant is higher than say 140 degrees, and the temperature of the said coolant decreases toward 140 degrees, the thermostatic element 14 contracts and pulls the valve 11 to its closed position.

As the valve 11 opens and closes, the ball head 18 of the linkage pin 17, which is freely retained in the arcuate shaped socket 21, travels arcuately therein thereby permitting the linkage pin 17 and the power stroke of the bellows 14 to rotate with the valve 11 and at all times be normal to the said valve 11 at all positions of the said valve. Although the disclosure herein contemplates a ball head 18 on the linkage pin 17, it is obvious that other means for freely retaining the end of the linkage pin 17 in an arcuate shaped socket may be employed to accomplish the desired results. Inasmuch as the power stroke of the bellows 14 is at all times tangential to the arcuate path of the said bellows, a comparatively small bellows is required since the full power stroke thereof is utilized to move the said valve 11 from any position.

It will be noted that the mounting of the bellows in cooperation with the ball and arcuate socket joint between the butterfly valve 11 and the housing 10 is such that no springs or means other than the bellows itself is required to close the butterfly valve once it has been opened, except, however, as hereinbefore described, the streamlining of the said butterfly valve 11 and the providing of a baffle 27 at the inflow end of the casing 10 may be required under certain conditions of velocity of coolant through the valve assembly.

The simplicity of construction of the thermostatic valve assembly disclosed herein, the elimination of unnecessary moving parts, and the protection of the ball and arcuate socket joint thereof from the accumulation of foreign matter from coolant passing through the same, all tend toward economy of manufacture, long operation without mechanical breakdown and freedom from cleaning and servicing during use.

Although but two specific embodiments of this invention have been disclosed and described herein, it will be understood that various changes including the size, shape, arrangement and details of the various parts thereof may be made without departing from the spirit of my invention and it is not intended to limit the scope thereof other than by the terms of the appended claims.

I claim:

1. In combination, a thermostatic valve comprising a tubular housing, a valve member pivoted in said housing biased toward its closed position by bending its inflow end to permit coolant passing through said housing to constantly urge said valve to pivot toward its closed position, a thermostatic element mounted on said valve member eccentric to its pivotal mounting, an arcuately grooved socket secured within said housing, and means secured to said thermostatic element engaged in said arcuately grooved socket adapted to arcuately travel therein with a movement of translation only with respect to said socket during the pivoting of the said valve by the expansion and contraction of the said thermostatic element.

2. In combination, a thermostatic valve comprising a tubular housing, a valve member pivoted in said housing biased toward its closed position by bending its inflow end to permit coolant passing through said housing to constantly urge said valve to pivot toward its closed position, a thermostatic element mounted on said valve member eccentric to its pivotal mounting, and a ball and arcuately grooved socket connection between the said thermostatic element and said housing in which the said ball is subject to a translatory movement only within said arcuately grooved socket as the thermostatic element pivots said valve within said housing.

EVERETT G. WRIGHT.